United States Patent
Favalora et al.

(10) Patent No.: US 7,364,300 B2
(45) Date of Patent: Apr. 29, 2008

(54) THETA-PARALLAX-ONLY (TPO) DISPLAYS

(75) Inventors: Gregg E. Favalora, Arlington, MA (US); Oliver S. Cossairt, Cambridge, MA (US)

(73) Assignee: Actuality Systems, Inc., Burlington, MA (US)

( * ) Notice: Subject to any disclaimer, the term of this patent is extended or adjusted under 35 U.S.C. 154(b) by 213 days.

(21) Appl. No.: 11/033,850

(22) Filed: Jan. 12, 2005

(65) Prior Publication Data

US 2005/0152156 A1 Jul. 14, 2005

Related U.S. Application Data

(60) Provisional application No. 60/535,874, filed on Jan. 12, 2004.

(51) Int. Cl.
*G03B 21/00* (2006.01)
*G03B 21/60* (2006.01)
*G09G 5/00* (2006.01)
*G03H 1/02* (2006.01)

(52) U.S. Cl. .......................... 353/7; 353/10; 353/122; 345/6; 359/28; 359/457; 359/458

(58) Field of Classification Search ............ 353/7, 353/10, 102, 122; 345/6, 419, 420; 359/1, 359/15, 19, 20, 22–25, 28, 32–35, 443, 446, 359/451, 454–459, 462, 463, 466, 470, 471, 359/477–479; 348/42, 51, 59; 349/15
See application file for complete search history.

(56) References Cited

U.S. PATENT DOCUMENTS

| 3,178,720 | A | | 4/1965 | Collender ............. 359/468 |
|---|---|---|---|---|
| 4,035,068 | A | * | 7/1977 | Rawson ................. 353/122 |
| 4,339,183 | A | * | 7/1982 | Yamada et al. ........... 353/78 |
| 5,132,839 | A | | 7/1992 | Travis .................. 359/462 |
| 6,095,652 | A | * | 8/2000 | Trayner et al. .......... 353/10 |
| 6,487,020 | B1 | | 11/2002 | Favalora ............... 359/619 |
| 6,554,430 | B2 | | 4/2003 | Dorval et al. ............. 353/7 |
| 2004/0057024 | A1 | * | 3/2004 | Nishio et al. ........... 353/94 |
| 2005/0110964 | A1 | * | 5/2005 | Bell et al. ............. 353/122 |

FOREIGN PATENT DOCUMENTS

JP 07-104683 * 4/1995

OTHER PUBLICATIONS

D. J. DeBitetto, "Holographic Panoramic Stereograms Synthesized from White Light Recordings", *Applied Optics*, vol. 8(8), pp. 1740-1741, Aug. 1969.

R. Hioki and T. Suzuki, "Reconstruction of Wavefronts in All Directions", *Japanese Journal of Applied Physics*, vol. 4, p. 816, 1965.

T. H. Jeong, P. Rudolf and A. Luckett, "360° Holography", *Journal of the Optical Society of America*, vol. 56(9), pp. 1263-1264, Sep. 1966.

* cited by examiner

*Primary Examiner*—Rochelle Blackman
(74) *Attorney, Agent, or Firm*—Cantor Colburn LLP

(57) ABSTRACT

A 3-D display may comprise a rotating optical diffuser for displaying 3-D parallax images in specific substantially unidirectional viewing zones as the rotating optical diffuser rotates; and a projector for projecting images through the rotating optical diffuser.

14 Claims, 17 Drawing Sheets

Front View

ISO View

The light sweeps out
a conic section.

Off-axis Fresnel concept

Off-centered section of Fresnel

Center of lens rotation

THETA-PARALLAX-ONLY (TPO) DISPLAYS

CROSS-REFERENCE TO RELATED APPLICATIONS

The present application claims priority to U.S. provisional application 60/535,874, filed Jan. 12, 2004, the entire disclosure of which is hereby incorporated by reference.

BACKGROUND

Spatial 3-D displays such as Actuality Systems Inc.'s Perspecta® Display create 3-D imagery that fills a volume of space and that appears to be 3-D to the naked eye. One such spatial 3-D display is described in U.S. Pat. No. 6,554,430, "Volumetric three-dimensional display system." This display is formed in the shape of a transparent dome and contains a rotating screen orientated vertically within the dome. As the screen spins it displays a previously recorded image for example at every 1 degree of rotation for 360 degrees. Human persistence of vision combines these images to create a 3-D view of the previously recorded image. This display with its vertical dome shape can be placed on top of a tabletop for example. One feature of this type of 3-D display is that the imagery provides motion parallax in every direction; in other words, it is a full parallax display.

Some 3-D displays provide motion parallax information with only one degree of freedom. A well-known family of 3-D displays with restricted motion parallax are horizontal parallax only (HPO) displays. Known HPO displays provide motion parallax along one axis, normally in the horizontal direction, corresponding to left-right motion; when the user moves vertically, the 3-D image appears to track the user's motion because of the lack of vertical parallax information. Displays of this type are taught in: U.S. Pat. No. 3,178,720, "Three dimensional unaided viewing method and apparatus, "; D. J. DeBitetto, "Holographic Panoramic Stereograms Synthesized from White Light Recordings," in *Applied Optics*, Vol 8(8), pp. 1740-1741 (August 1969); and U.S. Pat. No. 5,132,839, "Three dimensional display device."

Another type of restricted parallax display can be called the theta parallax only (TPO) display, which provides motion parallax for a user moving angularly around the display. A 360-degree hologram is a display hologram of this type, as described in R. Hioki and T. Suzuki, "Reconstruction of Wavefronts in All Directions," in *Japanese Journal of Applied Physics*, Vol. 4, p. 816 (1965); and in T. H. Jeong, P. Rudolf, and A. Luckett, "360° Holography," in *Journal of the Optical Society of America*, Vol. 56(9), pp. 1263-1264 (September 1966). A cylindrical hologram is another display of this type. As taught in the present application, one embodiment described below is a new example of a TPO display and is a circular display located in a top or in the middle of a table for use with multiple users sitting around a conference room table.

SUMMARY OF THE INVENTION

An embodiment of the present 3-D display may comprise a rotating optical diffuser for displaying 3-D parallax images in specific substantially unidirectional viewing zones as the rotating optical diffuser rotates; and a projector for projecting images through the rotating optical diffuser.

An embodiment of the present 3-D display may comprise optical means for displaying 3-D parallax images in specific substantially unidirectional viewing zones; and a projector for projecting images to the optical means.

An embodiment of the present display may be an in-table top 3-D display and may comprise optical means located in a plane of a flat table top for displaying 3-D parallax images; and a projector for projecting images to the optical means.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

Figure 1:
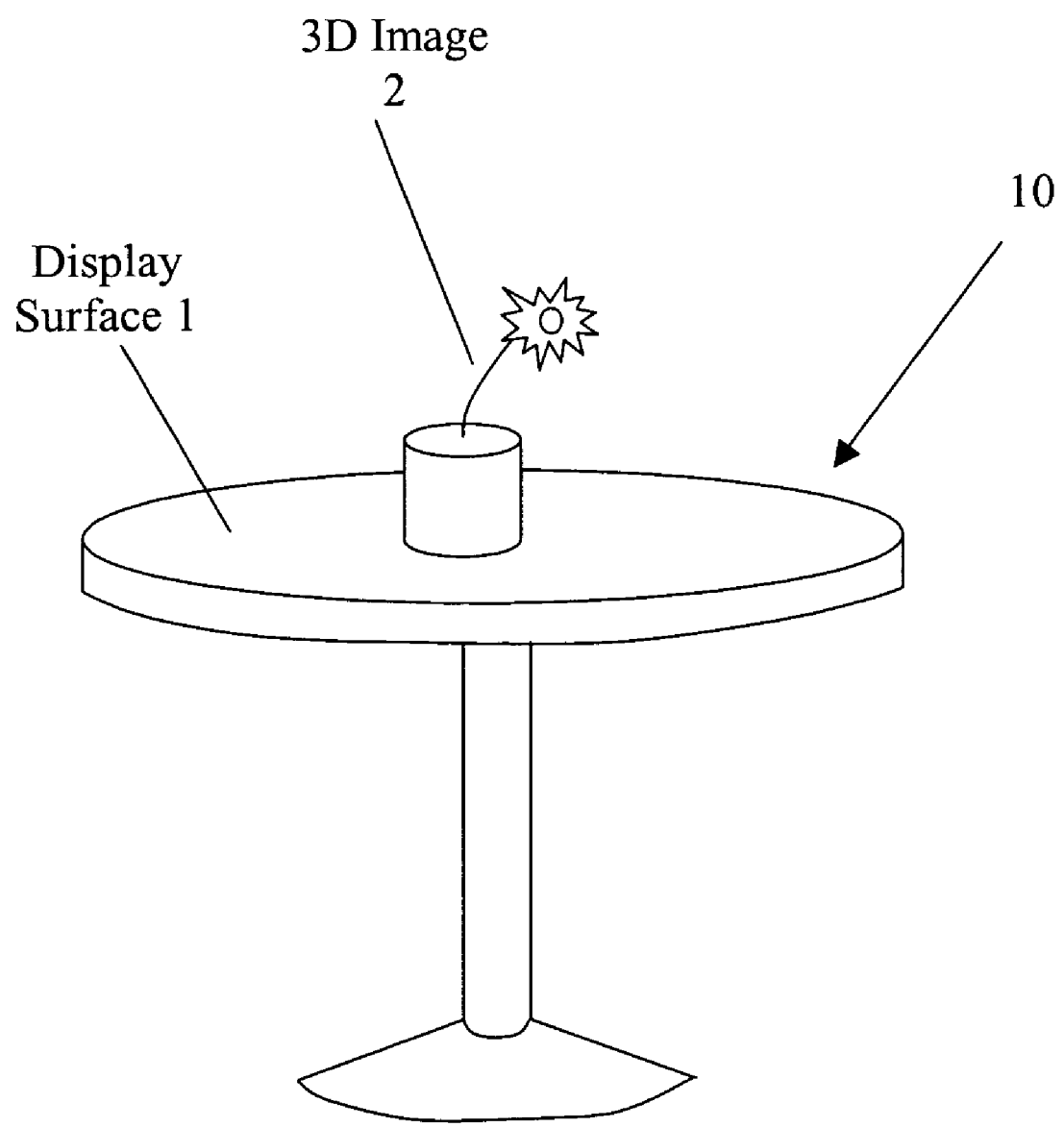
FIG. 1 is a perspective view of an embodiment of tabletop plane TPO display.
Figure 2:
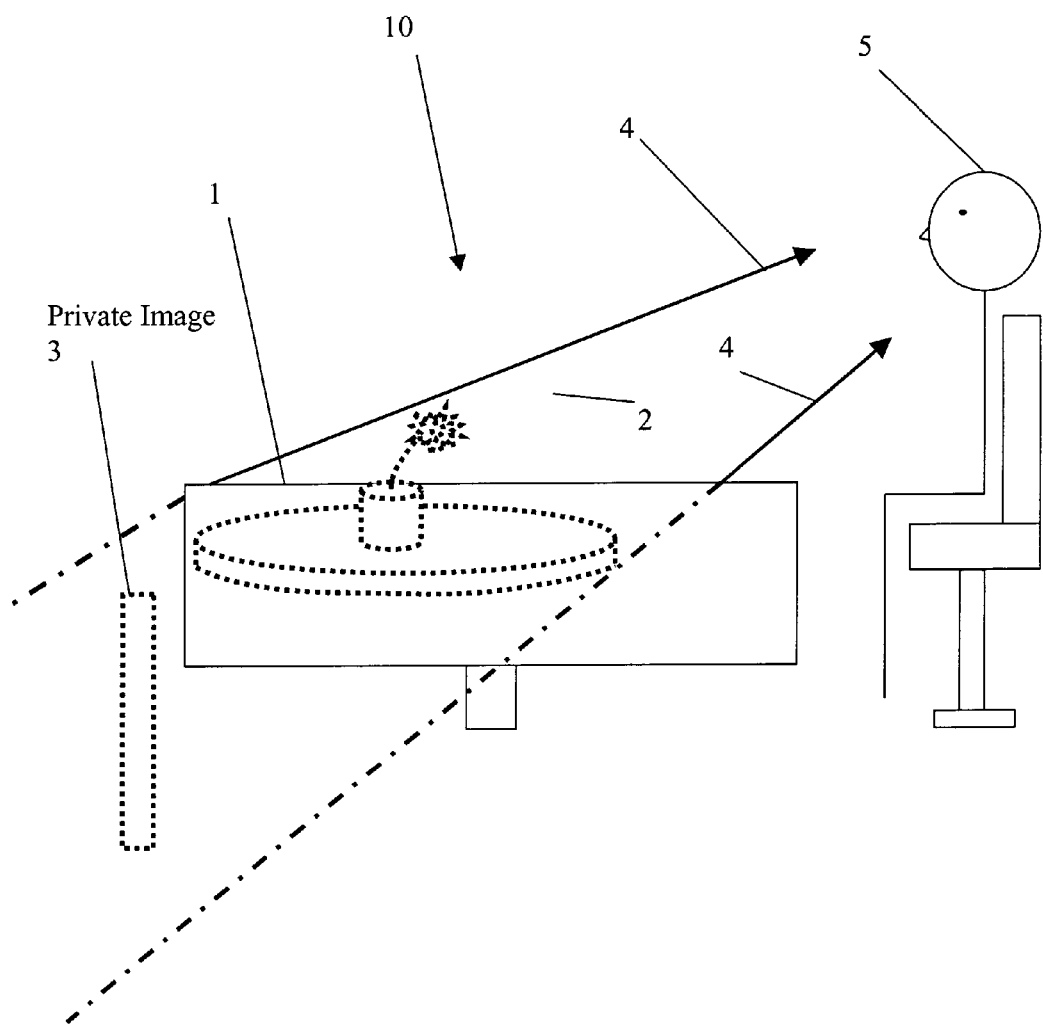
FIG. 2 is a side view of an embodiment of a tabletop plane TPO display.

The present specification describes theta-parallax-only (TPO) displays which provide motion parallax to a user or users. In one embodiment, as shown in FIGS. 1-2, an "in-tabletop TPO display" 10 is shown. With this display, a user may move circumferentially about a flat display surface 1 of the "in-tabletop" TPO display 10 while viewing a 3-D image 2 located towards the center of the flat display surface 1.

One exemplary application is a conference room "in-tabletop" display for military visualization, in which 3-D imagery floats above and/or within the table. Additional applications may include, but are not limited to, medical visualization, teleconferencing for mechanical design, and entertainment. Additionally, as shown in FIG. 2, the in-table top TPO display 10 may enable the projection of parallax "private images" 3 which are only visible from a given seating position.

Figure 3:
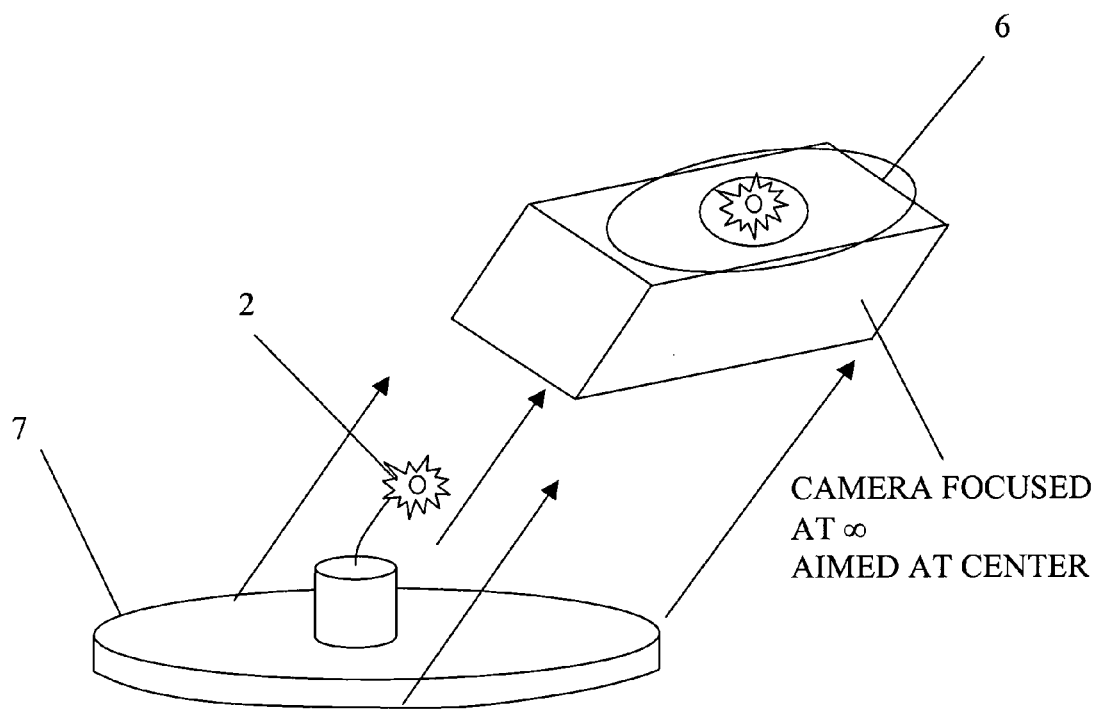
FIG. 3 is perspective view of an embodiment of a camera as it images a 3-D subject.

Thus, as shown in FIGS. 1 and 2, 3-D imagery can be positioned anywhere along the line of sight 4 that connects each active display element of the tabletop and the viewer's eyes 5. For a given eye position, the associated display space is conical. Therefore 3-D imagery can appear to float above, to straddle, or to lie deep within the table. "Window violations" may occur if any parts of the 3-D scene fall out of the display space. Several 3-D displays fall within the TPO family. These include conical stereograms and cylindrical holograms.

Figure 4:
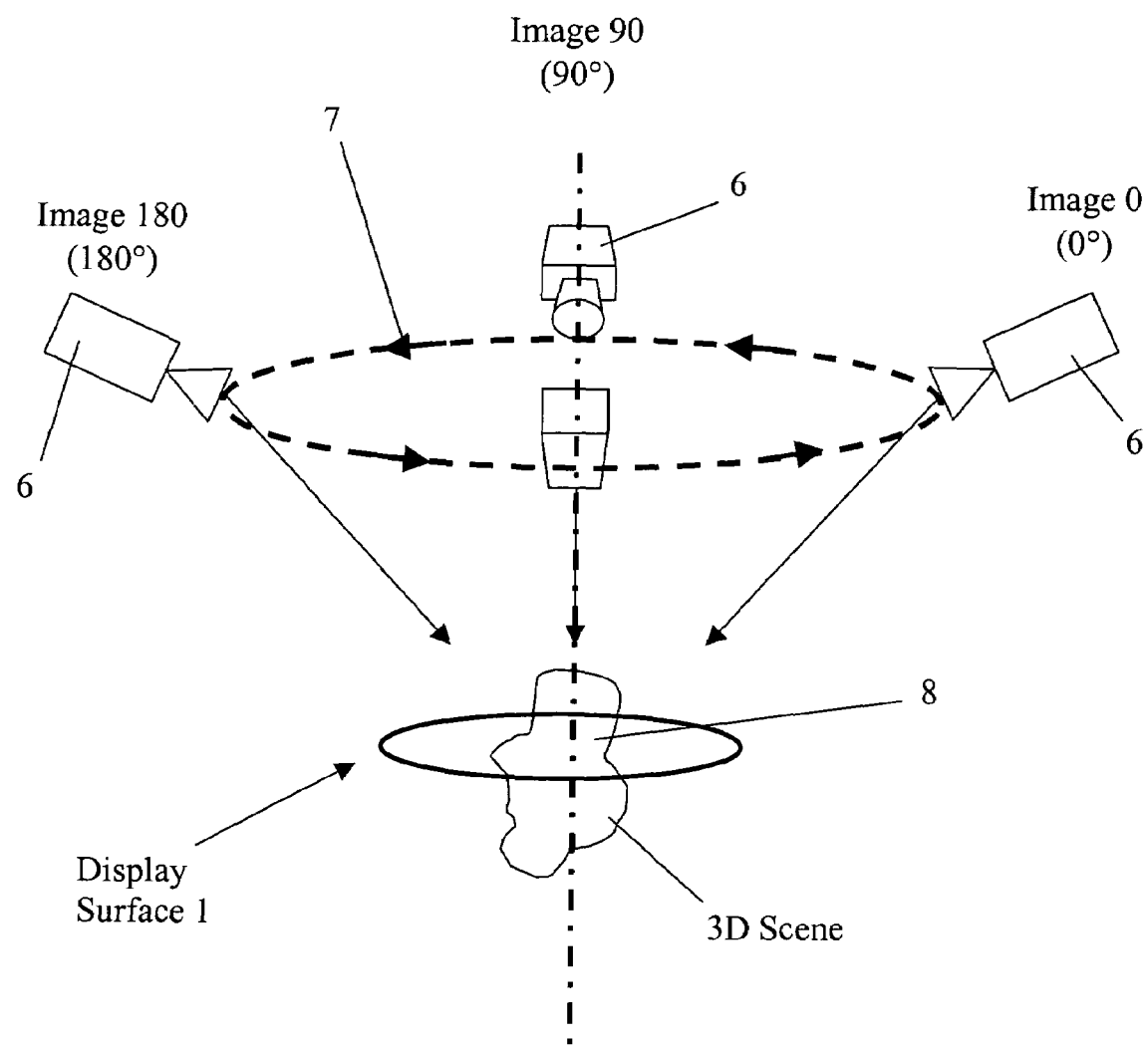
FIG. 4 is perspective view of an embodiment of a camera as it images a 3-D subject along a circular track.

In FIGS. 3 and 4 image data used to create the 3-D image 2 or 3-D scene 8 composed of several 3-D subjects in a scene, is recorded by rendering or recording a 3-D scene from multiple viewpoints. Generally, a 2-D camera 6 will follow a circular path 7 above the 3-D image 2 or a 3-D scene 8. In this embodiment, the camera 6 will always be oriented so that the camera 6 points at the center of the 3-D scene 8 that will be reproduced as appearing to straddle the flat in-table top display surface 1. The camera 6 should be orthographic, i.e., placed at a radius of infinity. One position of the camera is shown in FIG. 3. In this embodiment, one recorded view per degree is adequate totaling 360 views total. This is illustrated in FIG. 3. Of course, the camera 6 can be a physical camera or a computer-graphic "camera" as is well-known in the field of computer graphics.

Figure 5:
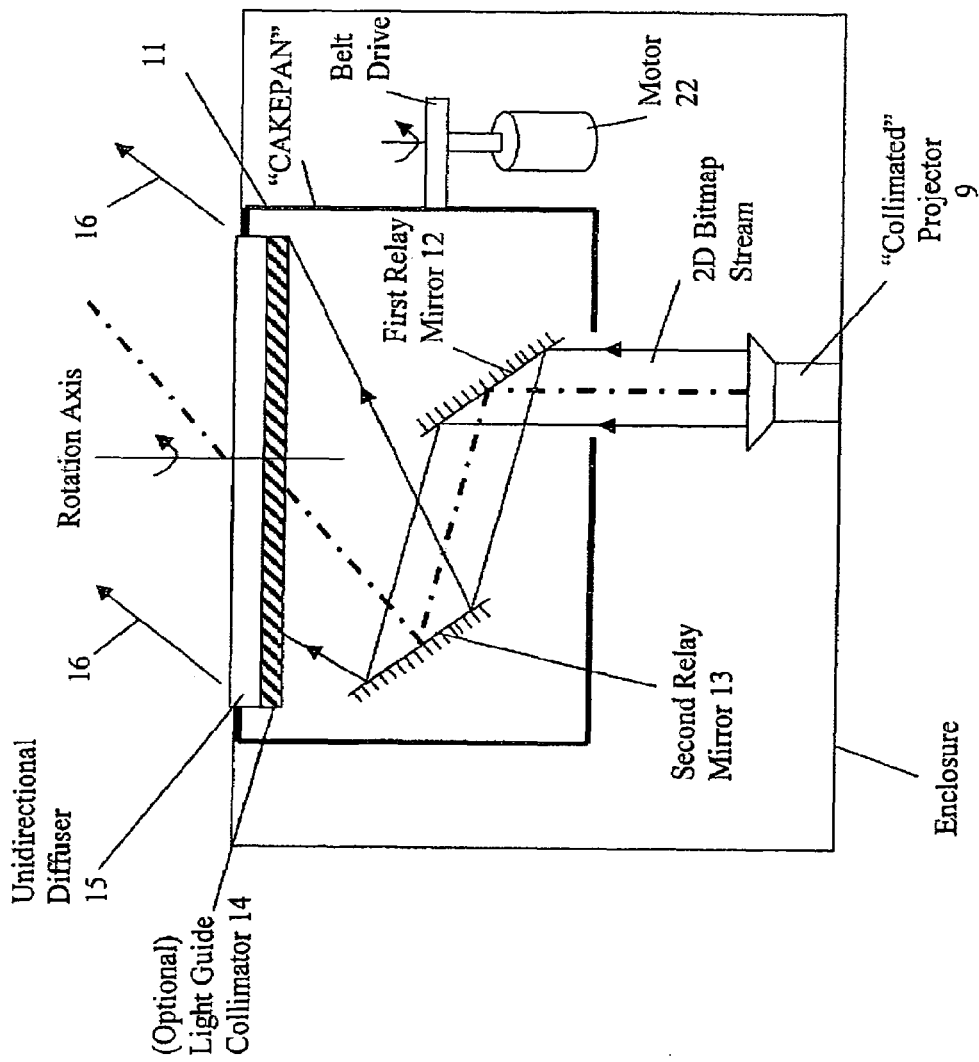
FIG. 5 is a cut away side view of an embodiment of a TPO display.
Figure 15:
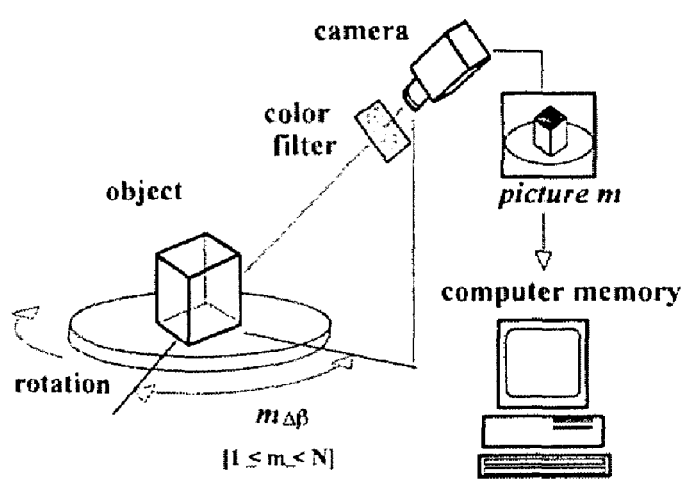
FIG. 15 is a diagram of a perspective camera system.
Figure 16:
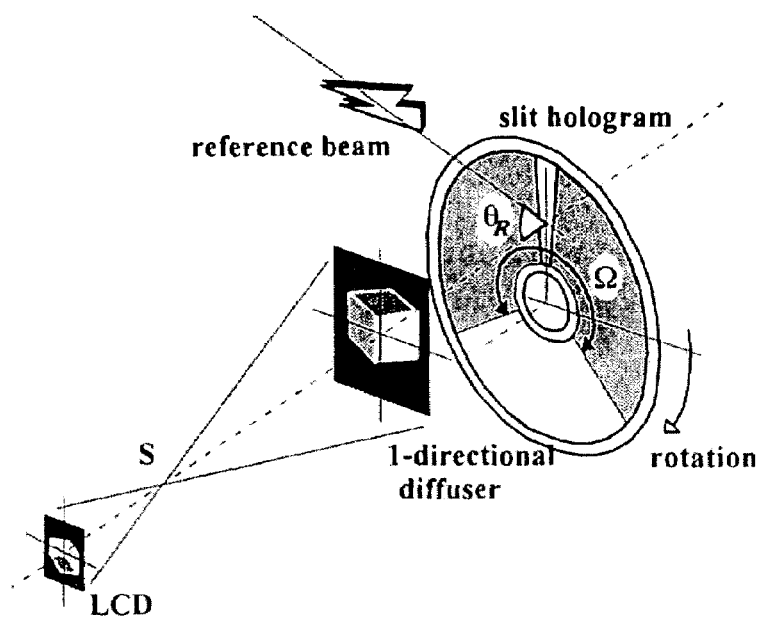
FIG. 16 is a diagram of a conical hologram recording scheme.
Figure 17:
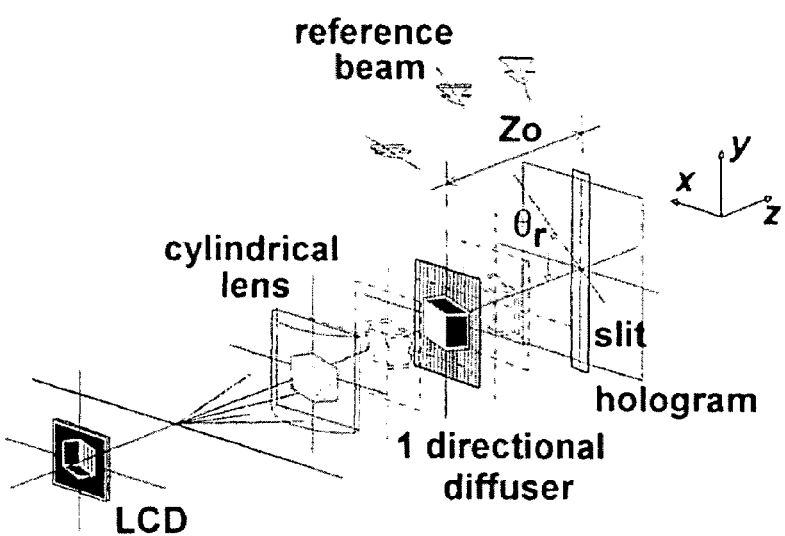
FIG. 17 is a recording scheme for recording a color holographic stereogram.

Once the image data is recorded and stored, the 3-D image 2 or the 3-D scene 8 may be recreated. See Prior Art FIG. 15 for a diagram of a known image view recording arrangement. As shown in FIG. 5, a fast digital micromirror device (DMD) based 2-D digital DMD projector 9 capable of 10,000+ frames per second is illuminated using collimated illumination, enabling an image to form at any distance from the projector, up to several meters.

Significantly, in order to provide the flat in-table top display surface 1, in this embodiment, a rotating element or assembly of elements will rotate and is located in the plane of the tabletop. Thus, the overall apparatus retains the look of a flat table. The important point to note is that the flat in-table top display surface 1 is flat and does not protrude. A viewable side of the flat rotating display surface is structured to be locatable flush within the surface plane of the table top and is structured to be a flat section of the flat table top. Alternatively, the flat rotating display surface can be inset below the surface of the rest of the table, changing the depth of the principal 3-D image location.

Thus, it is also possible for an embodiment of this invention to form a table by itself. Therefore, the fact that this embodiment is suitable for placement within a tabletop does not mean that another embodiment of the display may not stand alone as a flat surface or that the display may make up most or all of the "table" as a piece of furniture because this is also envisioned.

In the embodiment shown in FIG. 5, a rotatable inverted cake pan 11 holds two relay mirrors, a first relay mirror 12, a second relay mirror 13, an optional collimating layer 14, and a unidirectional diffusing screen 15 as shown in FIG. 5. The DMD projector 9 illuminates the first relay mirror 12, which sends light to the second relay mirror 13, which in turn illuminates the collimating layer 14 and the unidirectional diffusing screen 15. The relay mirrors (12, 13) and display surfaces (14, 15) are rotated together at frequency of thirty (30) revolutions per second, in synchrony with the sequence of 360 images projected from the stationary DMD projector 9. For example in reference to FIGS. 4 and 5, recorded "image 0" is projected when the image surface comprised of the unidirectional diffuser 15 is oriented at 0 degrees during its rotation. "Image 90" is displayed at 90 degrees of rotation, and so on for all 360 images or slices of the total 3-D image 2 displayed in this embodiment. In this way, a flat in-table top display is created. The final diffusing layer may also be chosen to enable the viewer to move his head up and down within a specified viewing range of angles from the viewing surface, for example 45 degrees.

Figure 6A:
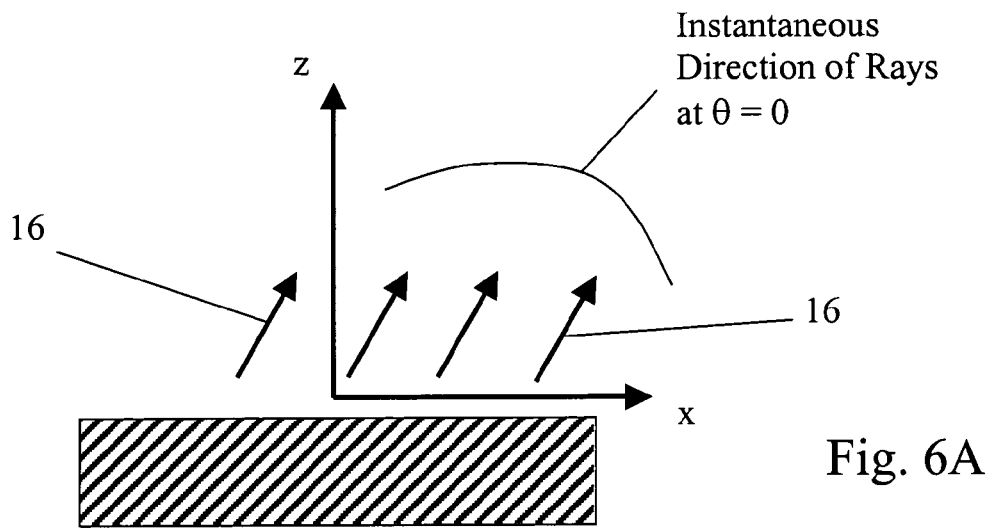
FIG. 6A is a side view of an embodiment of a TPO display.
Figure 6B:
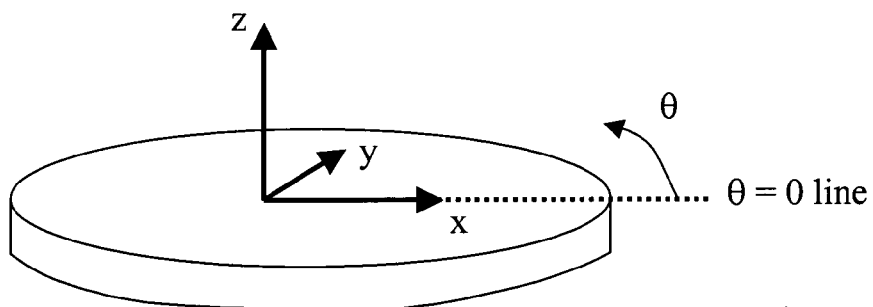
FIG. 6B is a perspective view of an embodiment of a TPO display.
Figure 7A:
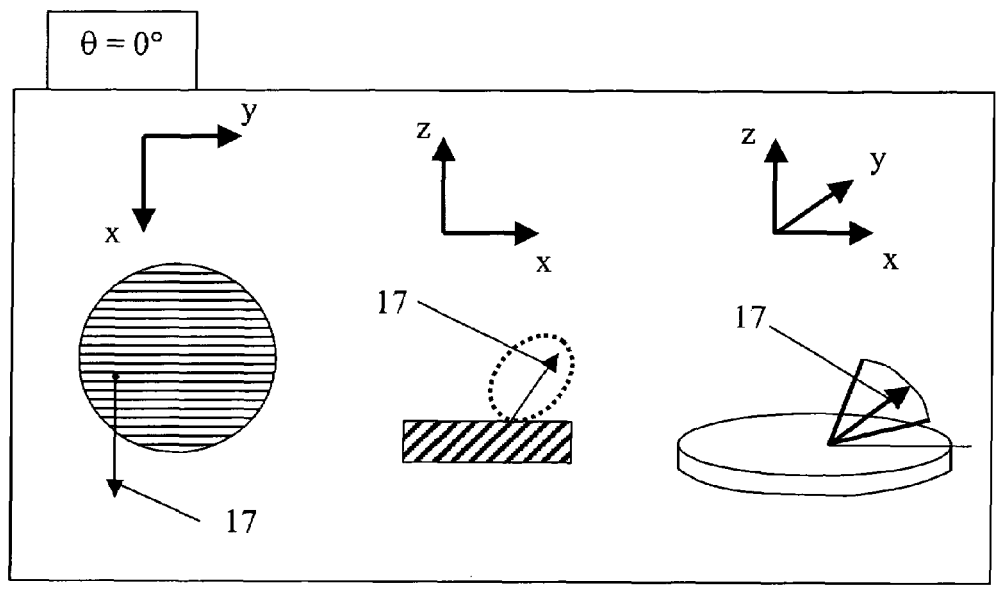
FIG. 7A is a ray diagram of an embodiment of a TPO display.
Figure 7B:
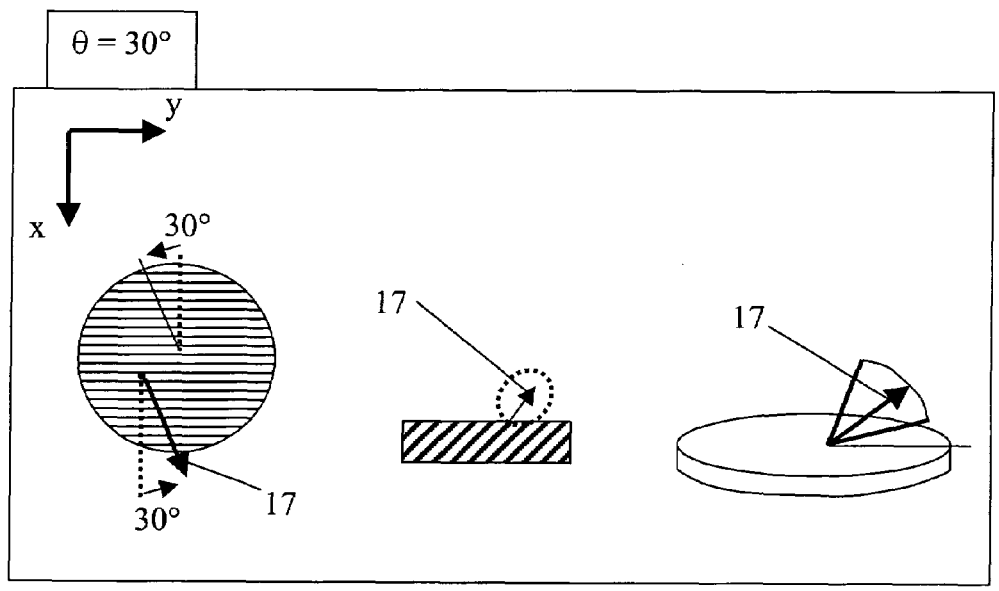
FIG. 7B is a ray diagram of an embodiment of a TPO display.
Figure 8:
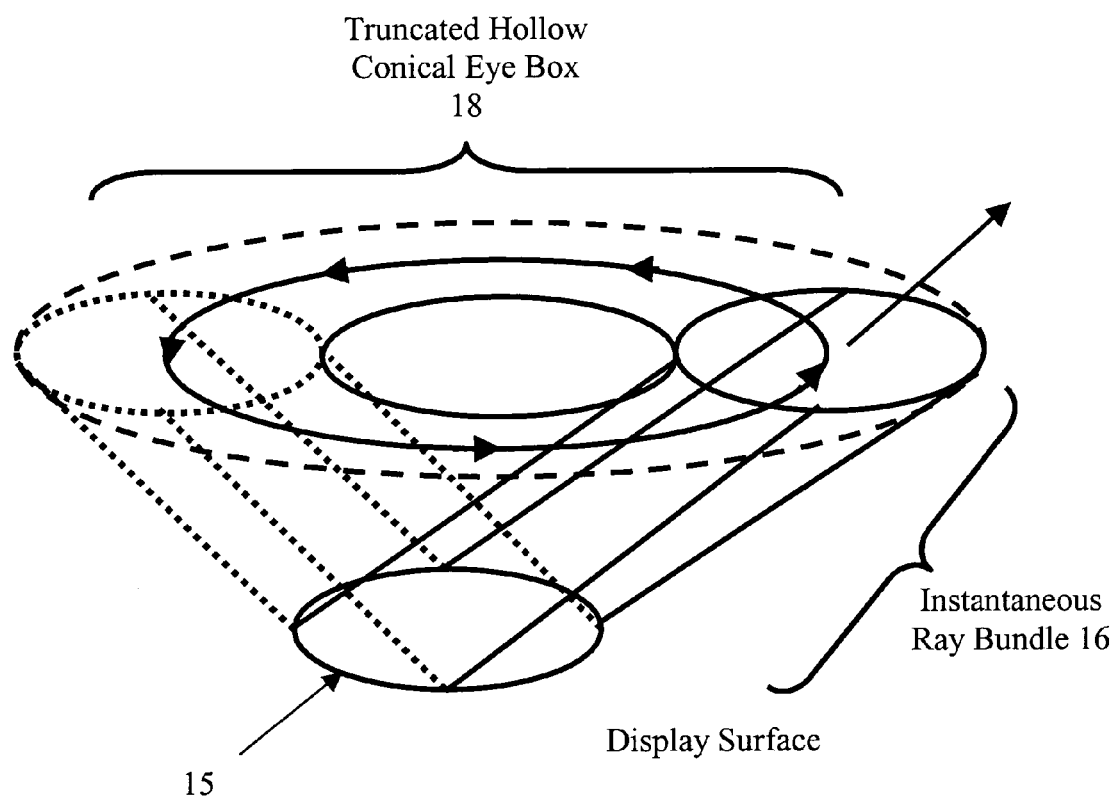
FIG. 8 is a ray diagram of an embodiment of a TPO display.

For optimum image quality, the present embodiment may create a display surface that is capable of casting a bundle of rays with a 2-D cross section that is pitched at an angle. This is illustrated in FIG. 6A. For example, in this embodiment, a ray bundle 16 exiting the display surface is propagated at an angle around 45 degrees from the display surface is chosen to intersect with the likely viewing height of the viewer. However, any suitable viewing angle can be configured. When the flat in table top display surface 1 is oriented parallel to the floor and is rotated about the vertical axis, the bundle of rays 16 will sweep out a large hollow truncated conical volume as shown in FIG. 8. The trajectory of one pixel 17, chosen from the overall bundle 16, is shown in FIGS. 7A and 7B. As the rotating cake pan 11 spins, the 2-D ray bundle sweeps out a truncated conical volume. The resultant conical volume is termed an "eye box" 18 herein and is illustrated in FIG. 8.

The motor 22 used to spin the image surface may use a belt drive or geared drive so that it can be placed alongside the image surface or elsewhere.

Figure 9:
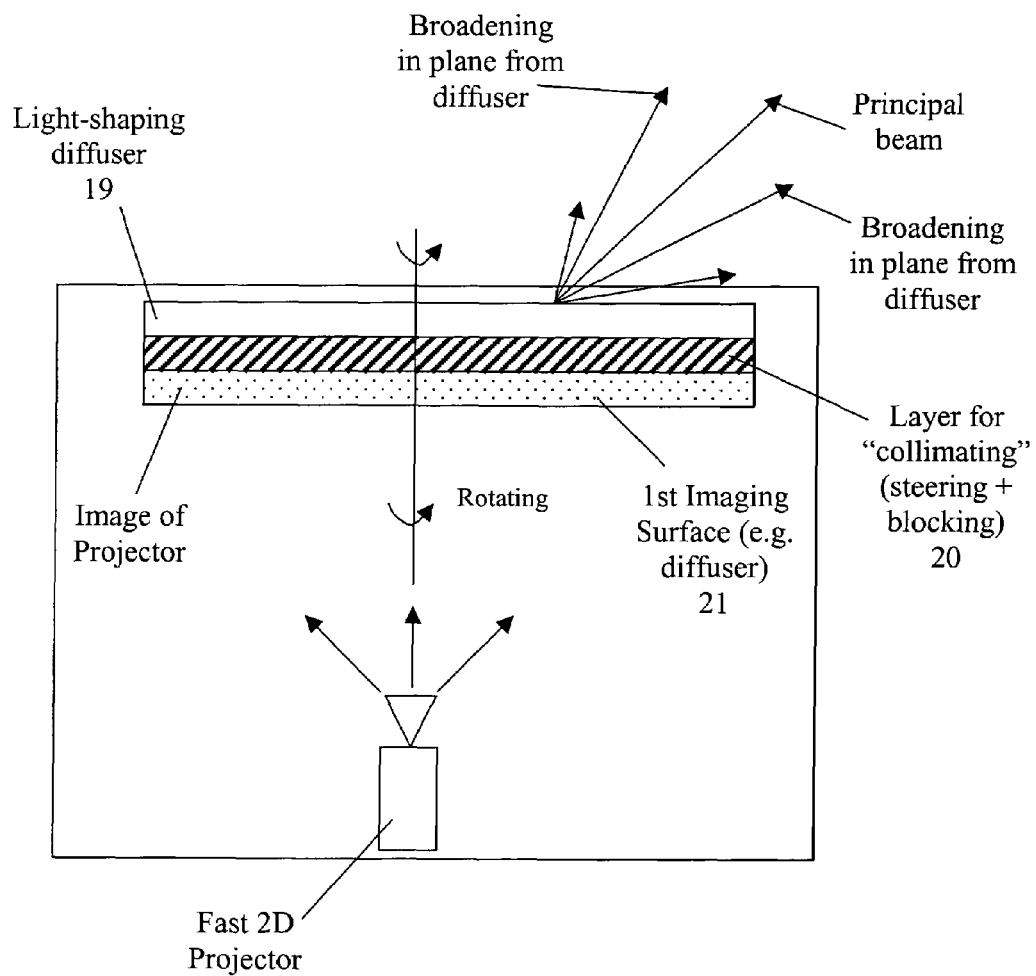
FIG. 9 is an embodiment of a TPO display.

Another embodiment having a spinning TPO display surface is shown in FIG. 9. However, this embodiment does not use a spinning vertical cake pan 11 for example. Instead, the spinning display surface is comprised of three optical elements sandwiched together. Specifically, a light shaping diffuser 19 is located on the surface. A collimating grid 20 is located beneath the light shaping diffuser and is pitched at an angle, for example 45 degrees. Lastly, a unidirectional diffuser 21 is used as an imaging surface for the projector. It noted herein that in this embodiment that there are no relay mirrors. Instead, the stationary projector illuminates the "spinning sandwich" comprised of three optical elements which sweeps out a conical volume. The 3-D data is captured as before.

Figure 10A:
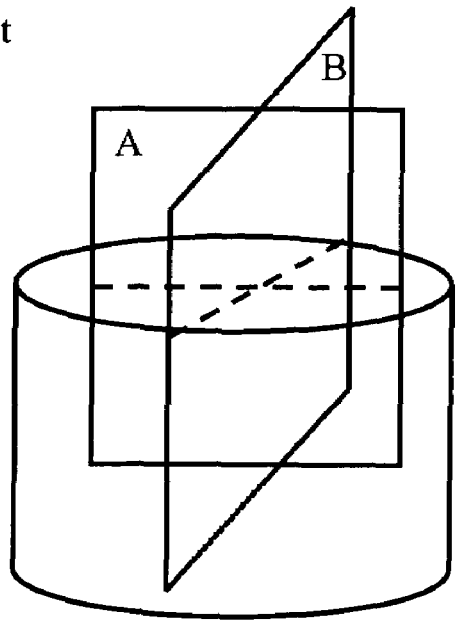
FIGS. 10A and 10B collectively referred to as FIG. 10 depicts a scan sequence diagram of an embodiment of a TPO display.
Figure 10B:
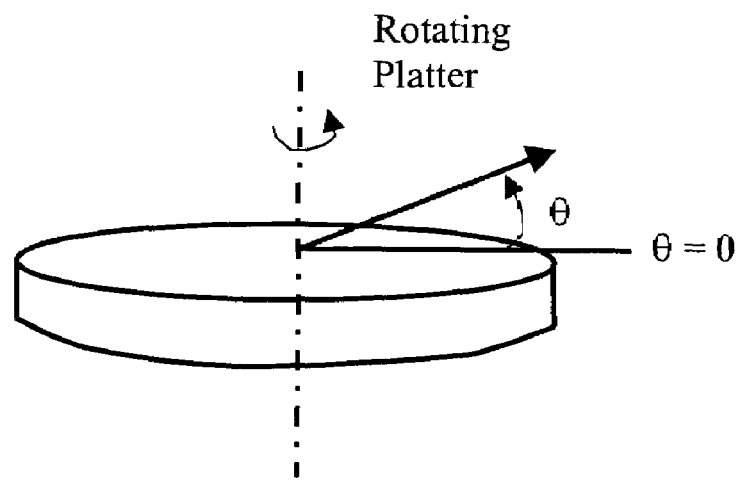
Figure 10C:
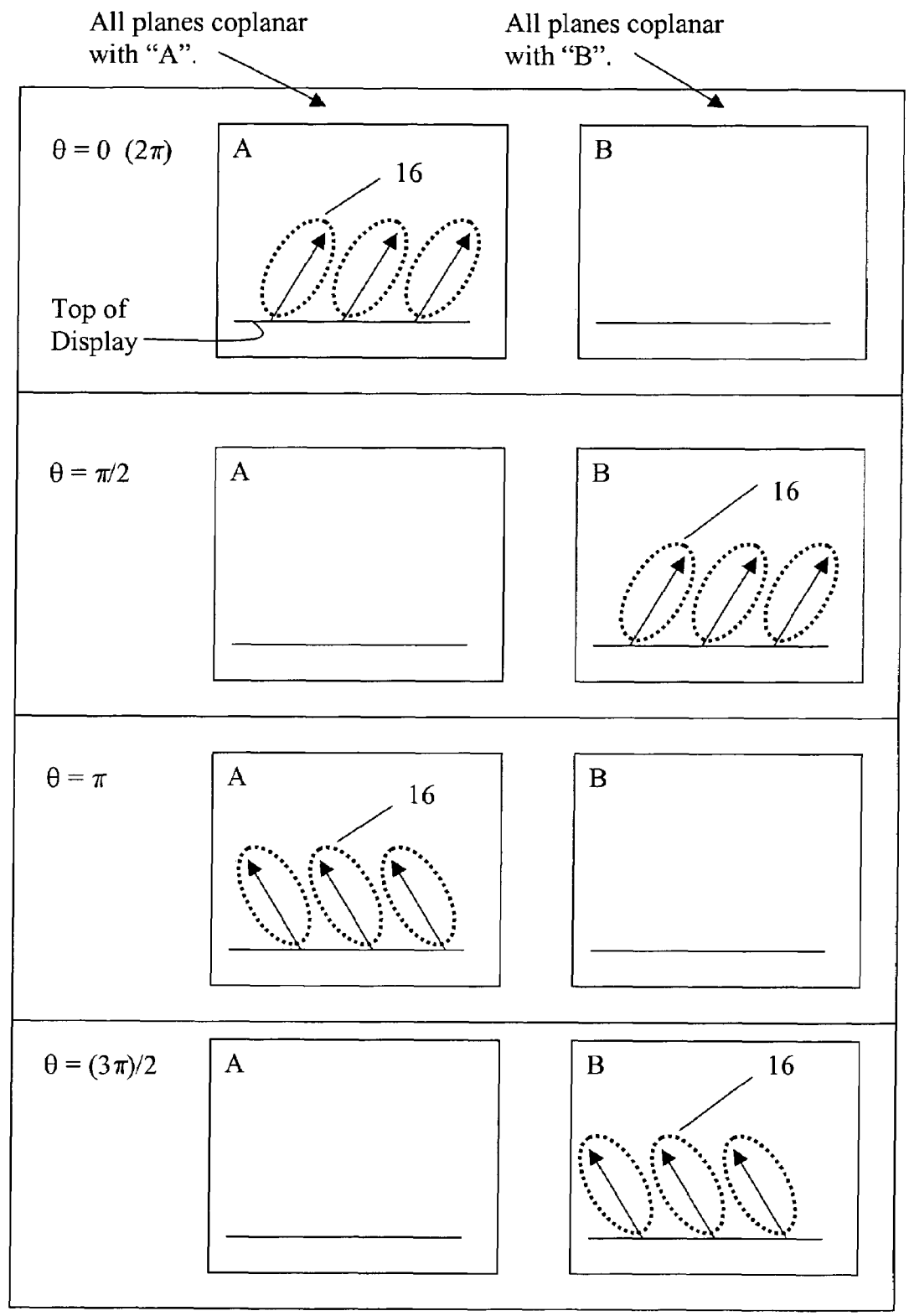

The concept of the image scan sequence is more specifically illustrated in FIG. 10. Using only four positions for purposes of illustration only, planes A and B are shown to depict the plane of ray bundle 16 projected at 0, 90, 180, and 270 degrees. 360 positions may be used for example, one at every degree, to display 360 images at rate of thirty revolutions per second. At this high rate of rotation, human persistence of vision combines the displayed images to form a 3-D image that is viewable from 360 degrees, i.e., a user or viewer can "walk around" the 3-D image 2.

Figure 11:
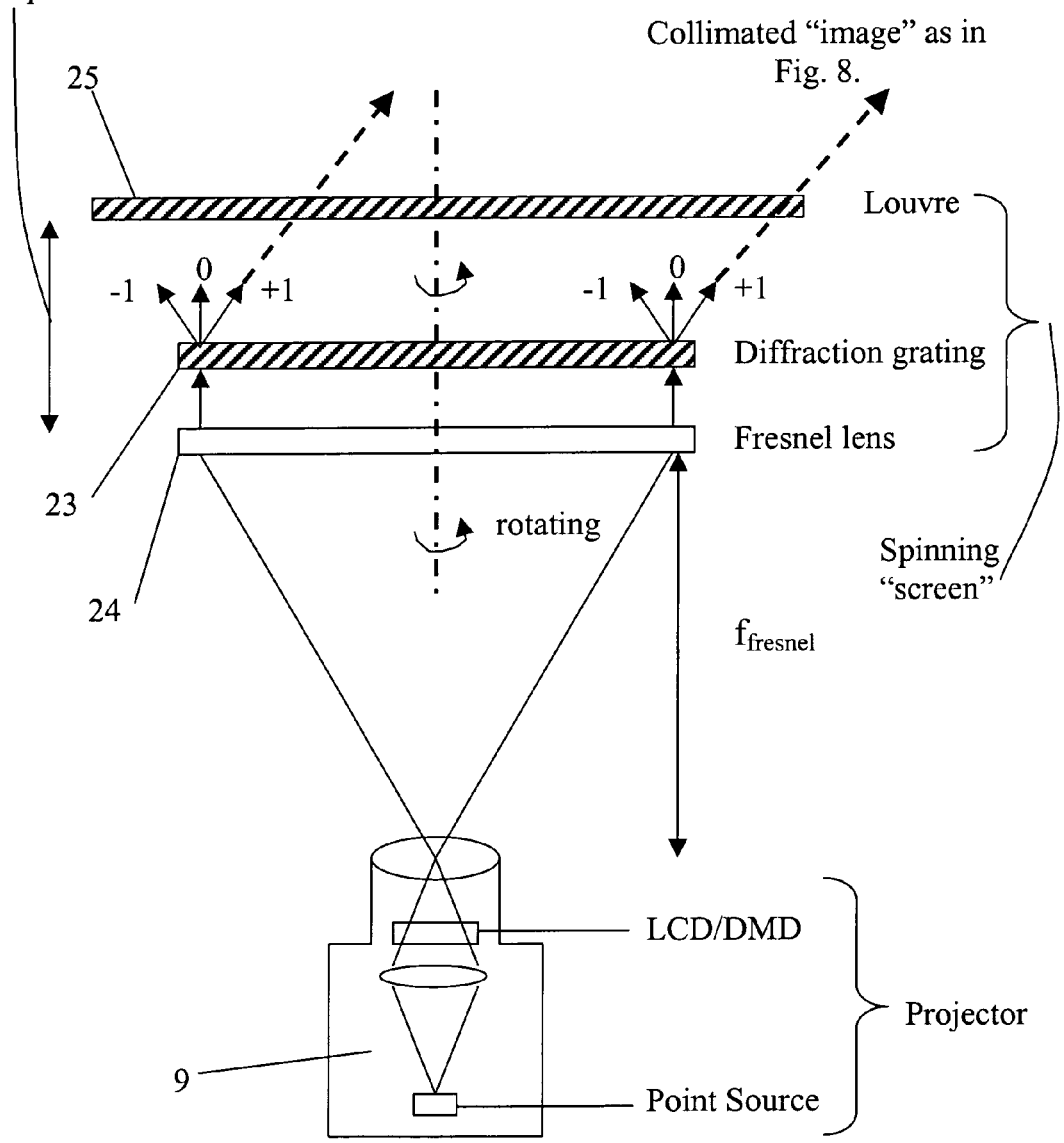
FIG. 11 is an embodiment of a TPO display.
Figure 18:
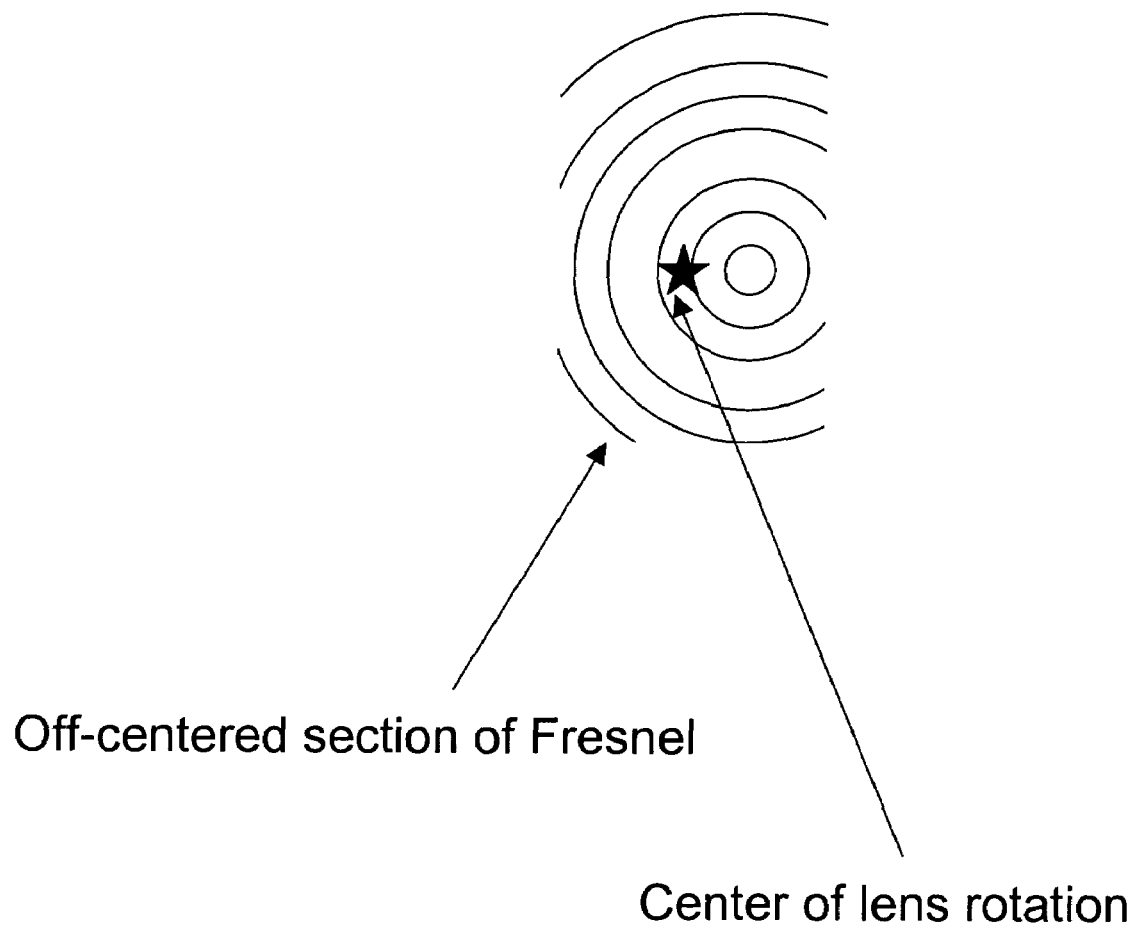
FIG. 18 is an off axis Fresnel lens.

Another embodiment is shown at FIG. 11 wherein the light-steering surface may be comprised of a diffractive optic such as a diffraction grating 23. The diffraction grating 23 may be as simple as a standard linear grating that spins. One such system composed of a single frequency linear grating sandwiched between a Fresnel lens 24 and a louver 25 is shown in FIG. 11. The embodiment can also be made with a stationary display surface if the projection optic is capable of a circumferential scan. Alternatively, an alternative to use of a grating could also be use of an off axis Fresnel lens as shown in FIG. 18.

Of course, there are many ways to construct TPO displays using the principles taught herein. The specific embodiments we describe are only a few among the set of all possible constructions that fall within the scope of the claims.

Figure 12:
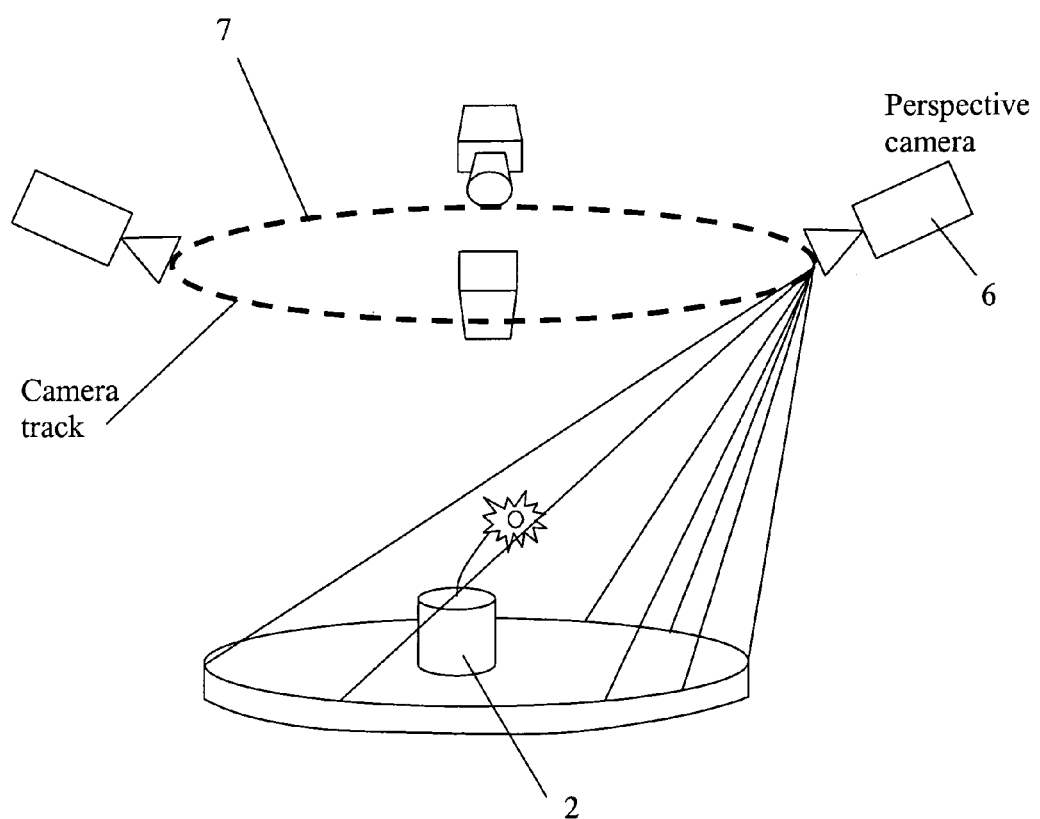
FIG. 12 is an embodiment of a TPO display.
Figure 13:
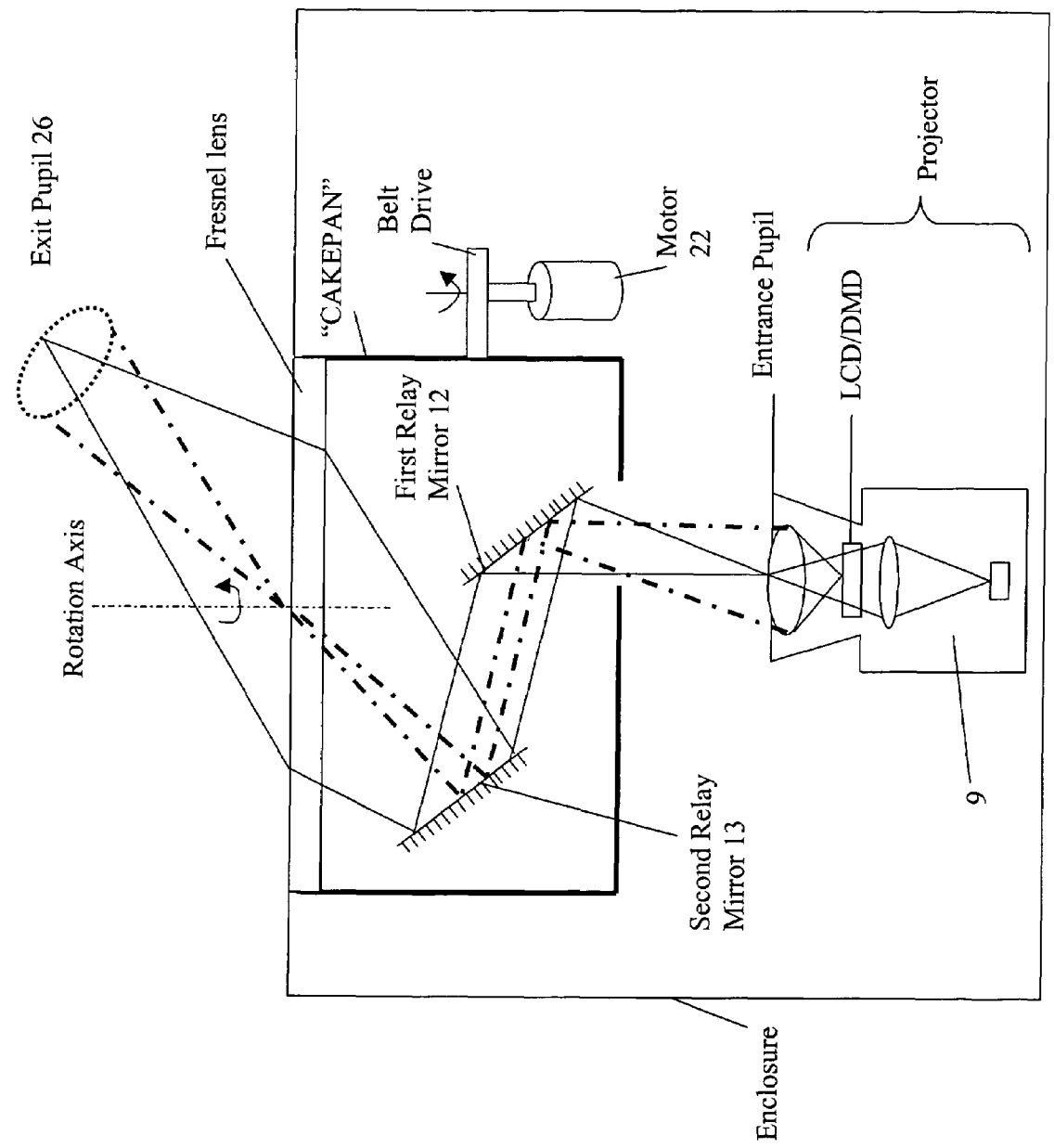
FIG. 13 is an embodiment of a TPO display.
Figure 14:
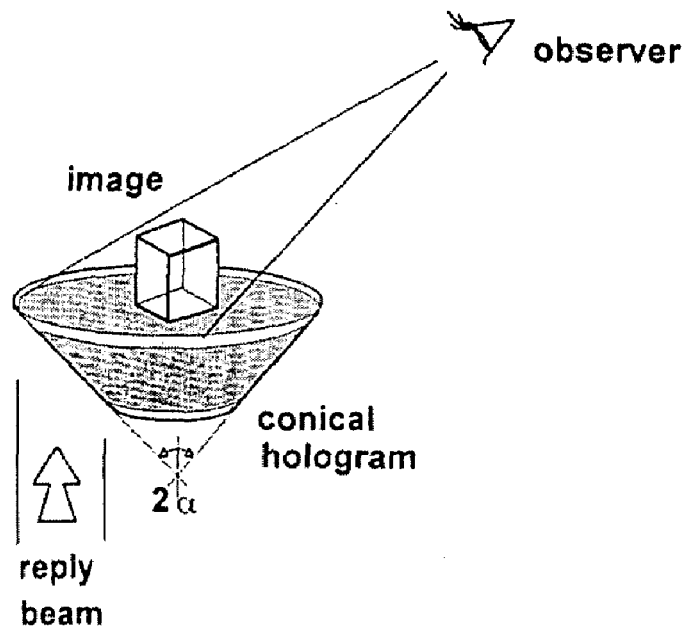
FIG. 14 is a diagram of a conical hologram.

Another embodiment is described in FIGS. 12 and 13. FIG. 12 demonstrates an alternative rendering or recording method that could be used, and FIG. 13 shows one possible projection system that would be used in conjunction with this system. The operation of this system is identical to that of the system in FIG. 5, however with modified optical properties. For example, instead of projecting collimated images from the display screen, the system of FIG. 13 system scans an exit pupil in the viewing zone to create a similar "eyebox" as is described in FIGS. 5 and 8. However, the direction of the rays 16 emanating from the display surface in FIG. 13 is different in this system because an exit pupil 26 is where the rays are directed.

The TPO systems described in this document can also be adapted for use in full-parallax 3-D displays. One or more of the relay mirrors inside the rotating inverted cakepan 11 of FIG. 5 or FIG. 11 could be made to rotate. The volume of rays swept out from such a system could fill a shape similar to a frustum, whereby the instantaneous ray bundles are "raster scanned" so that the "eyeboxes" are filled in a row by row manner.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A 3-D display comprising:
   a rotating optical diffuser for displaying 3-D parallax images in specific substantially unidirectional viewing zones as the rotating optical diffuser rotates; and
   a projector for projecting images through the rotating optical diffuser;
   wherein the rotating optical diffuser is located to rotate about an axis that is substantially normal to a display surface.

2. The 3-D display of claim 1 wherein the rotating optical diffuser is located to rotate in a plane parallel to a flat display surface plane of a flat display.

3. The 3-D display of claim 1 wherein the rotating optical diffuser further comprises:
   a light guide collimator.

4. The 3-D display of claim 1 wherein the rotating optical diffuser is rotated by a rotatable cakepan and wherein the cakepan is connected to a motor which turns the cakepan.

5. The 3-D display of claim 4 wherein at least one relay mirror is located in the cakepan for relaying images from the projector to the rotating optical diffuser.

6. The 3-D display of claim 1 wherein the projector is a digital micromirror device (DMD).

7. The 3-D display of claim 1 wherein the rotating optical diffuser propagates a bundle of rays with a 2-D cross section and wherein the bundle of rays are pitched at a desired display angle.

8. The 3-D display of claim 1 wherein the rotating optical diffuser is structured so that a bundle of projected rays sweep out a conical volume to form a 3-D image.

9. The 3-D display of claim 1 wherein the rotating optical diffuser is structured to propagate a bundle of rays with a 2-D cross section so that the bundle of rays form a private image viewable only from one viewing position.

10. The 3-D display of claim 1 wherein the rotating optical diffuser comprises a light shaping diffuser having a collimating light steering layer located beneath the light shaping diffuser and also having a first imaging surface located beneath the collimating light steering layer to receive images from the projector.

11. The 3-D display of claim 10 wherein the collimating light steering layer is a collimating grid located beneath the light shaping diffuser and collimates light to be pitched at an angle.

12. The 3-D display of claim 1 wherein the rotating optical diffuser comprises a louver having a diffraction grating located beneath the louver and a Fresnel lens located beneath the diffraction grating.

13. The 3-D display of claim 1 wherein the rotating optical diffuser comprises a Fresnel lens.

14. The 3-D display of claim 1 wherein the rotating optical diffuser comprises an off axis Fresnel lens.

* * * * *